United States Patent [19]

Dorai et al.

[11] Patent Number: 5,149,862
[45] Date of Patent: Sep. 22, 1992

[54] PREPARATION OF POLYTETRAMETHYLENE ETHER GLYCOL USING AN ACIDIC ZIRCONIA CATALYST

[75] Inventors: Suriyanarayan Dorai, Lockport; Melvin C. Baker, Youngstone; James A. Schultz, Grand Island, all of N.Y.

[73] Assignee: E. I. Du Pont de Nemours and Company, Wilmington, Del.

[21] Appl. No.: 661,010

[22] Filed: Feb. 26, 1991

[51] Int. Cl.$^5$ .................. C07C 67/24; C07C 69/16; C07C 41/01; C07C 43/13
[52] U.S. Cl. .................................. 560/240; 568/617
[58] Field of Search ..................... 560/240; 568/617

[56] References Cited

U.S. PATENT DOCUMENTS 4,259,531  3/1981  Huchler et al. ............. 560/240 X
4,727,199  2/1988  King ........................... 560/240 X

FOREIGN PATENT DOCUMENTS 2951080  7/1981  Fed. Rep. of Germany ...... 560/240
3008174  9/1981  Fed. Rep. of Germany ...... 560/240

Primary Examiner—Vivian Garner

[57] ABSTRACT

A process for polymerizing tetrahydrofuran to produce polytetramethylene ether glycol or ester-capped polytetramethylene ether glycol is disclosed. The reaction mass is carried out at 10° to 80° C. and preferably 20° to 60° C. In a preferred aspect of the invention, a mixture of acetic anhydride and acetic acid is present in the reaction mixture.

7 Claims, No Drawings

PREPARATION OF POLYTETRAMETHYLENE ETHER GLYCOL USING AN ACIDIC ZIRCONIA CATALYST

FIELD OF THE INVENTION

The present invention relates to the polymerization of tetrahydrofuran to produce polytetramethylene ether glycol using a zirconium based catalyst. The catalyst is prepared by exposing $Zr(OH)_4$, prepared by hydrolysis of $ZrO(NO_3)_2$, to sulfuric acid and then calcining in air at 400 to 650° C.

BACKGROUND OF THE INVENTION

Polytetramethylene ether glycol (PTMEG) is a commodity in the chemical industry, widely used in the manufacture of polyurethanes and polyesters. It is commonly prepared by reacting tetrahydrofuran (THF) with a strong acid catalyst, such as fluorosulfonic acid, and then quenching the product with water.

While this process has proved to be quite satisfactory, it is not as efficient as desired because the acid catalyst cannot be recovered and reused. Moreover, disposal of the spent acid catalyst is a problem because of its toxicity and corrosiveness.

A more recent process, as disclosed in U.S. Pat. No. 4,120,903, polymerizes tetrahydrofuran using a polymer containing alpha-fluorosulfonic acid groups and a chain terminator which is water or 1,4-butanol diol. The nature of the catalyst permits its reuse, thereby eliminating the disposal problems and the catalyst's lack of solubility in the reaction mass makes it easy to separate the catalyst from the product at the end of the polymerization reaction. This very low solubility also minimizes loss of catalyst as the reaction proceeds. However, this process produces a polytetramethylene ether glycol having a molecular weight of 10,000 or more, while the commercial products generally have molecular weights of less than 4,000 with the majority of commercial products having a number average molecular weight of either 1,000 or 2,000.

An even more recent U.S. Pat. No. 4,163,115 disclosed that the molecular weight of the polytetramethylene ether glycol product, when using a polymer having alpha-fluorosulfonic acid groups as catalyst can be controlled by adding acylium ion precursor to the reaction medium. The acylium ion precursors were acyl halides and anhydrides of carboxylic acids whose carboxylic acid moieties contain 1 to 36 carbon atoms and especially those of 1 to 4 carbon atoms. Acetic anhydride, propionic anhydride and formic-acetic anhydride were specifically illustrated. The use of mixtures of acetic acid and acetic anhydride as molecular weight control agent is also disclosed.

SUMMARY OF THE INVENTION

The present invention relates to the use of a zirconium-based solid super acid to polymerize tetrahydrofuran to produce polytetramethylene ether glycol. The product is well within the desired number average molecular weight range of 650 to 4,000.

The reaction rate is low, but can be dramatically increased by using acetic anhydride/acetic acid as terminators. This product is a diacetate which needs to be converted to the diol (glycol).

DETAILED DESCRIPTION OF THE INVENTION

The catalyst used in the present invention is an acidic zirconium oxide. It can be prepared by hydrolyzing $ZrOCl_3 \cdot 8H_2O$ and $ZrO(NO_3)_2 \cdot 2H_2O$ with aqueous ammonia, washing and drying to form $Zr(OH)_4$. The $Zr(OH)_4$ is treated with dilute (1N) sulfuric acid and then calcined in air at 400° to 650° C. Further details of catalyst preparation are disclosed in "Synthesis of Solid Superacid Catalyst With Acid Strength of $H < -16.04$", JCS Chem. Comm., pp 851 & 852, 1980, M. Hino and K. Arata, and in "Preparation and Characterization of $ZrO_2$ and $SO_4^{2-}$ Promoted $ZrO_2$", Materials Chemistry and Physics, 16, 1986, pp 66–77, by T. Yamaguchi and K. Tanabe. Generally the catalyst should be in the form of a finely divided powder that will pass a 100 mesh screen (U.S. Sieve Series) so as to present a relatively large surface area, which affects the reaction rate. Otherwise the particle size of the catalyst is not critical.

The catalyst is present in the reaction mass in a catalytically effective amount, which in the usual case means a concentration of about 1% to 40% by weight of the mass, preferably 2% to 20%.

The tetrahydrofuran used as the reactant in the process of the invention can be any of those commercially available. It preferably has a water content of less than about 0.001% by weight, and a peroxide content of less than 0.002% by weight, and preferably contains an oxidation inhibitor, such as butylated hydroxytoluene, to prevent formation of undesirable by-products and color.

If desired 0.1 to 50% by weight of the tetrahydrofuran of an alkyl tetrahydrofuran, copolymerizable with tetrahydrofuran can be used as a co-reactant. Such an alkyl tetrahydrofuran can be represented by the structure

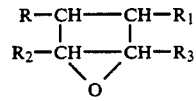

where any one of —R, —R$_1$, —R$_2$ or —R$_3$ is an alkyl radical of 1 to 4 carbon atoms, the remaining —Rs being hydrogen.

Illustrative of such alkyl furans are 2-methyl tetrahydrofuran and 3-methyl tetrahydrofuran.

The rate of the reaction can be increased about 30 fold by having present a mixture of acetic anhydride and acetic acid. The mixture, acetic anhydride and acetic acid, generally will be present in an amount of 0.5 to 30 weight percent of the reaction mass with from 1 to 25 weight percent being the preferred range. Generally the weight ratio of acetic anhydride/acetic acid will be within the range of 20/1 to 0.1/1 with 10/1 to 0.5/1 being the preferred range.

The process of the invention can be run in either a batch or continuous mode.

When run in a batch mode, proper amounts of tetrahydrofuran, acetic anhydride/acetic acid mixture (if used), and zirconium catalyst are placed in a reactor and stirred while the desired reactions are maintained. When the reactions are finished, the catalyst and the reaction mass are separated, and the product is then separated from the remainder of the mass. When run continuously, the process can be run in a back-mixed slurry reactor with continuous stirring and with continuous addition of reactants and continuous removal of product. Alternatively, the process can be run in a pipeline reactor.

In a pipeline reactor, the process is run under plug-flow conditions, whereby reactants move through the reactor, which is packed with catalyst. The movement is continuous with little or no mixing of the feed with partially converted reactants, and with the reactants reacting as they move along.

The pipeline reactor is preferably oriented vertically, with the reactants moving upwardly through the catalyst, which tends to suspend the catalyst and make the flow of reactants freer. The reactants can also move downwardly through the reactor, but this tends to compact the catalyst and restrict the flow of reactants.

In either the slurry reactor or the pipeline reactor, it is preferable to adjust the temperature in the reaction zone, the concentration of reactants in the reaction zone and the flow rate of the reactants into and out of the reaction zone so that about 5 to 85% by weight, preferably 15 to 40% by weight, of the tetrahydrofuran is converted to polytetramethylene ether glycol or acetate end-capped polytetramethylene ether glycol. The effluent of each pass, after the product has been removed, can be recycled to the reactor. It is also preferable, if a mixture of acetic anhydride and acetic acid are being used, that at least about 40% by weight and even more preferable about 80 to 90% by weight of the acetic anhydride/acetic acid mixture be consumed on each pass of reactants through the reactor. With proper adjustment of concentrations of reactants in the feed stream, flow rates and temperature, all of these conditions can ordinarily be obtained with a residence time of the reactants in a continuous reactor of 10 minutes to 2 hours, preferably 15 to 60 minutes, and even more preferably 20 to 45 minutes.

Residence time (in minutes) is determined by measuring the free volume (in milliliters) of the reaction zone and then dividing this figure by the flow rate (in milliliters per minute) of the reactants through the reactor. In a slurry reactor, the reaction zone is the entire volume of the reaction mixture; in a pipeline reactor the reaction zone is the zone containing the catalyst.

In either a batch or continuous mode, the process is ordinarily run at atmospheric pressure, but reduced or elevated pressure may be used to aid in controlling reaction conditions such as temperature of the reaction mass during the reaction.

Generally the temperature of the reaction mass is kept in the range of 10° to 80° C. with 20° to 65° C. being the preferred range.

In a batch mode, the process is ordinarily run for 1 to 24 hours.

On completion of the polymerization reaction, the catalyst can be separated from the reaction mass by filtration, decantation or centrifugation, and reused. If the catalyst is run in a continuous fashion, the catalyst can simply be allowed to remain in the reactor while fresh reactants are fed in and product is removed.

In either the batch or continuous mode, after removal of the catalyst, the product is separated from the reaction mass by extracting residual unreacted tetrahydrofuran, and, if present, acetic anhydride and acetic acid from the reaction mass by distillation or by stripping the reaction mass with steam or an inert gas such as nitrogen.

If the product is acetate-capped polytetramethylene ether glycol, it can be converted to polytetramethylene ether glycol by reacting it with an alkanol, using a basic catalyst to give polytetramethylene ether glycol and an alkyl acetate by-product. Generally the alkanol will contain from 1 to 10 carbon atoms with from 1 to 4 carbon atoms being the preferred range. Methanol and ethanol are the preferred alkanols.

The product can range in properties from a clear viscous liquid to a waxy solid. The number average molecular weight of the product can be as high as about 30,000, but will usually range from about 650 to about 4,000, and more commonly will range from 650 to 2,900.

Number average molecular weight is determined by end group analysis or by using spectro-scopic methods well known in the art.

The molecular weight of the product can be kept in any desired range by varying the ratio of acetic anhydride to acetic acid in the reactant feed, by varying the total amounts of acetic anhydride and acetic acid in the reactant feed, by varying the temperature of the reaction mass within certain limits, by controlling the residence time of the reactants in the reaction zone and by varying the catalyst concentration. Generally the larger amounts of acetic anhydride and/or acetic acid give polymers with lower molecular weights, lower reaction temperatures favor production of polymers with higher molecular weights and higher temperatures favor production of polymers with lower molecular weight, and higher catalyst concentrations favor lower molecular weights.

EXAMPLES

In each of the examples a 250 ml flask fitted with a mechanical stirrer, condensor and nitrogen source was charged with the amounts of catalyst, tetrahydrofuran (THF), acetic anhydride ($Ac_2O$) and acetic acid (AcOH) reported in the Table. In the Table Mn stands for number average molecular weight. The catalyst was prepared by dissolving 100 g zirconium oxynitrate in 1000 ml of deionized water. 100 g of aqueous ammonium hydroxide was then added at room temperature. The resultant preciptate was collected and washed with deionized water until the wash water has a neutral pH. A portion of the resultant zirconium hydroxide was treated with 1N $H_2SO_4$ (300 ml) for 1 hour at room temperature. The mixture was then filtered and dried at 110° C. for 24 hours. The resulting powder was then calcined for the time and at the temperature reported below. In Examples 1–5 the catalyst was calcined in air at 625° C. for 2 hours. In Example 6 the catalyst was calcined in air at 420° C. for 2 hours. In Examples 7, 8, 9 and 10 the catalyst was calcined in air at 600° C. for 2 hours. In Examples 11–17 the catalyst was calcined in air at 6° C. for 3 hours. In Example 17 the catalyst was the wet catalyst from Example 15 being reused. In Example 18 the catalyst was calcined in air at 600°–620° C. for 5 hours. In Example 19 the catalyst was calcined in air at 420° C. for 2 hours. In Example 20 the catalyst was calcined in air at 600° C. for 2 hours. In Examples 20–29 the catalyst was calcined in air at 600° C. for 24 hours. In Examples 1–20 and 25–29, the catalyst was powdered but not screened. In Example 21 the catalyst passed a 100 mesh screen and was retained on a 200 mesh screen (U.S. Sieve Series). In Example 22 the catalyst passed a 60 mesh screen and was retained on a 100 mesh screen (U.S. Sieve Series). In Example 23 the catalyst passed a 200 mesh screen and was retained on a 325 mesh screen (U.S. Screen Series). In Example 24 the catalyst passed a 325 mesh screen (U.S. Sieve Series). In Examples 1-6, 11, 13-15, 17 and 20 the reaction was run at 35° C. In Examples 7 and 28 the reaction was run at 50° C. In Examples 8, 21-24 and 27 the reaction was run at 55° C. In Examples 9, 25 and 26 the reaction was run at 60° C. In Example 10 the reaction was run at 22° C. In Example 12 the reaction was run at 25° C. In Example 16 and 18 the reaction was run at 33°C. In Example 19 the reaction was run at 32°C. In Example 29 the reaction was run at 45°C.

As can be seen from the examples, in general, the molecular weight of the product polytetramethylene ether glycol decreases both as a function of higher temperature and higher acetic anhydride concentrations. Example 26 was run at 60° C. with a high acetic anhydride concentration and therefore had low molecular weight.

We claim:

TABLE

| Example | Catalyst g | THF g | Ac$_2$O g | AcOH g | Time (hours) | Mn | Conversion % |
|---|---|---|---|---|---|---|---|
| 1 | 25 | 50 | 0 | 0 | 19 | 2016 | 6.0 |
| 2 | 1 | 100 | 10 | 1 | 2.5 | 1487 | 1.5 |
| | | | | | 6 | 1766 | 2.8 |
| 3 | 10 | 100 | 15 | 0 | 4 | 1587 | 9.5 |
| | | | | | 23 | 1487 | 42.5 |
| | | | | | 7 | 1024 | 71.4 |
| 4 | 20 | 100 | 15 | 1 | 1 | 1426 | 8.3 |
| | | | | | 6 | 1205 | 20.3 |
| | | | | | 29 | 1197 | 23 |
| 5 | 10 | 90 | 15 | 15 | 2 | 1174 | 7.1 |
| | | | | | 4 | 1142 | 15.8 |
| | | | | | 25 | 817 | 44.0 |
| 6 | 10 | 100 | 15 | 1 | 1 | 792 | 7.1 |
| | | | | | 3.5 | 822 | 13.6 |
| | | | | | 4.5 | 825 | 17.4 |
| | | | | | 27 | 882 | 28.6 |
| 7 | 10 | 90 | 9 | 1 | 1.5 | 1500 | 27 |
| | | | | | 4.0 | 1385 | 37 |
| | | | | | 6.0 | 1288 | 56 |
| 8 | 10 | 90 | 9 | 1 | 2.0 | 1222 | 25 |
| | | | | | 3.0 | 1210 | 31 |
| | | | | | 5.0 | 1183 | 41 |
| | | | | | 7.0 | 1285 | 49 |
| 9 | 10 | 90 | 9 | 1 | 1.0 | 1463 | 13 |
| | | | | | 2.0 | 1288 | 27 |
| | | | | | 3.0 | 1209 | 30 |
| | | | | | 4.5 | 1142 | 45 |
| | | | | | 7.0 | 999 | 52 |
| | | | | | 31 | 916 | 53 |
| 10 | 25 | 50 | 0 | 0 | 19 | 2016 | 5.95 |
| | | | | | 23 | 1216 | 2.67 |
| | | | | | 42 | 1640 | 1.69 |
| 11 | 1 | 100 | 5 (ml) | | 1 | 3113 | 1.53 |
| | | | | | 2 | 2687 | 1.18 |
| | | | | | 3 | 3070 | 1.38 |
| | | | | | 24 | 2411 | 4.83 |
| 12 | 1 | 100 | 10 | 0 | 1 | 2498 | 0.52 |
| | | | | | 22 | | 7.82 |
| 13 | 1 | 100 | 10 | 1 | 2.5 | 1487 | 1.45 |
| | | | | | 6 | 1766 | 2.83 |
| | | | | | 23 | 2101 | 5.34 |
| 14 | 10 | 100 | 15 | 0 | 1.5 | | 3.6 |
| | | | | | 4 | 1587 | 9.52 |
| | | | | | 23 | 1487 | 42.5 |
| | | | | | 27 | 1866 | 47.6 |
| | | | | | 52 | 1365 | 69.4 |
| | | | | | 70.5 | 1102 | 71.5 |
| | | | | | 77 | 1024 | 71.4 |
| 15 | 20 | 100 | 15 | 1 | 1 | 1426 | 8.35 |
| | | | | | 6 | 1205 | 20.26 |
| | | | | | 24 | 1079 | 19.97 |
| | | | | | 26 | 1010 | 16.2 |
| | | | | | 29 | 1197 | 22.9 |
| 16 | 10 | 100 | 15 | 15 | 2 | 1174 | 7.11 |
| | | | | | 4 | 1142 | 15.79 |
| | | | | | 24 | 840 | 38.9 |
| | | | | | 25 | 817 | 44.0 |
| | | | | | 30 | 842 | 36.8 |
| | | | | | 46 | 741 | 45.3 |
| | | | | | 119 | 760 | 48.4 |
| 17 | 25 | 100 | 15 | 1 | 0 | 982 | 1.8 |
| | | | | | 1 | 1092 | 5.7 |
| | | | | | 2 | 988 | 9.5 |
| | | | | | 3 | 1021 | 11.8 |
| | | | | | 4 | 1053 | 14.1 |
| | | | | | 17 | 1244 | 40.6 |
| | | | | | 89 | 962 | 61.0 |
| 18 | 10 | 100 | 15 | 1.5 | 1 | 1587 | 4.83 |
| | | | | | 4 | 1636 | 15.32 |
| | | | | | 29.5 | 1285 | 63.3 |
| | | | | | 48 | 929 | 72.5 |
| | | | | | 53.5 | 886 | 91.0 |
| 19 | 10 | 100 | 15 | 1.5 | 1 | 792 | 7.1 |
| | | | | | 3.5 | 822 | 13.6 |
| | | | | | 4.5 | 825 | 17.4 |
| | | | | | 6.5 | 839 | 22.6 |
| | | | | | 23 | 826 | 34.2 |
| | | | | | 26.5 | 882 | 28.6 |
| | | | | | 30.5 | 842 | 30.2 |
| | | | | | 47 | 838 | 31.4 |
| 20 | 10 | 90 | 9 | 1 | 2 | 1706 | 8 |
| | | | | | 4 | 2147 | 18 |
| | | | | | 6 | 2327 | 24 |
| 21 | 10 | 90 | 9 | 1 | 1 | 1115 | 17 |
| | | | | | 3 | 967 | 38 |
| | | | | | 4.5 | 924 | 48 |
| | | | | | 6 | 867 | 50 |
| 22 | 10 | 90 | 9 | 1 | 1 | 1411 | 9 |
| | | | | | 3 | 1235 | 18 |
| | | | | | 4 | 1149 | 35 |
| | | | | | 6 | 1070 | 39 |
| 23 | 10 | 90 | 9 | 1 | 1 | 1281 | 17 |
| | | | | | 2 | 1174 | 31 |
| | | | | | 3 | 1110 | 43 |
| | | | | | 5 | 995 | 64 |
| | | | | | 6 | 944 | 53 |
| 24 | 10 | 90 | 9 | 1 | 1 | 1255 | 16 |
| | | | | | 2 | 1162 | 31 |
| | | | | | 3 | 1114 | 46 |
| | | | | | 5 | 1009 | 55 |
| | | | | | 6 | 944 | 47 |
| 25 | 10 | 90 | 9 | 1 | 1 | 1463 | 13 |
| | | | | | 2 | 1288 | 27 |
| | | | | | 3 | 1209 | 30 |
| | | | | | 4.5 | 1142 | 45 |
| | | | | | 7 | 999 | 52 |
| | | | | | 31 | 916 | 53 |
| 26 | 10 | 100 | 15 | 1.5 | 2 | 663 | 25 |
| | | | | | 3 | 651 | 32 |
| | | | | | 6.5 | 569 | 38 |
| | | | | | 9 | 614 | 44 |
| | | | | | 74 | 554 | 43 |
| 27 | 10 | 90 | 9 | 1 | 2 | 1222 | 25 |
| | | | | | 3 | 1210 | 31 |
| | | | | | 5 | 1183 | 41 |
| | | | | | 7 | 1285 | 49 |
| 28 | 10 | 90 | 9 | 1 | 1.5 | 1500 | 27 |
| | | | | | 4 | 1385 | 37 |
| | | | | | 6 | 1288 | 56 |
| 29 | 10 | 90 | 9 | 1 | 1 | 1850 | 9 |
| | | | | | 3 | 2500 | 17 |
| | | | | | 6 | 1718 | 40 |

1. A process comprising contacting tetrahydrofuran with a catalytically effective amount of acidic zirconium oxide at 10° to 80° C. in the presence of 0.5 to 30 percent of the reaction mass of a mixture of acetic acid and acetic anhydride and recovering polytetramethylene ether glycol or an acetate-capped polytetramethylene ether glycol.

2. The process of claim 1 wherein the weight ratio of acetic anhydride to acetic acid in the reaction mass is from 20/1 to 0.1.

3. The process of claim 2 wherein the tetrahydrofuran is contacted with acidic zirconium oxide at from 20° to 65° C.

4. The process of claim 3 wherein the acidic zirconium oxide comprises 0.1 to 40 percent by weight of the reaction mass.

5. The process of claim 4 wherein from 1 to 25 weight percent of the reaction mass is a mixture of acetic anhydride and acetic acid.

6. The process of claim 5 wherein the weight ratio of acetic anhydride to acetic acid in the reaction mass is from 10/1 to 0.5/1.

7. The process of claim 6 wherein the zirconium oxide comprises from 2 to 20 percent by weight of the reaction mass.

* * * * *